United States Patent
Reynolds et al.

(10) Patent No.: US 10,795,509 B2
(45) Date of Patent: Oct. 6, 2020

(54) FORCE SENSING WITHIN DISPLAY STACK

(71) Applicant: SYNAPTICS INCORPORATED, San Jose, CA (US)

(72) Inventors: Joseph Kurth Reynolds, San Jose, CA (US); Tom Vandermeijden, Los Gatos, CA (US); Tetsuo Tanemura, Yokohama (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/199,464

(22) Filed: Jun. 30, 2016

(65) Prior Publication Data

US 2017/0277296 A1 Sep. 28, 2017

Related U.S. Application Data

(60) Provisional application No. 62/312,894, filed on Mar. 24, 2016.

(51) Int. Cl.
*G06F 3/044* (2006.01)
*G06F 3/041* (2006.01)

(52) U.S. Cl.
CPC .......... *G06F 3/044* (2013.01); *G06F 3/0412* (2013.01); *G06F 3/0414* (2013.01); *G06F 2203/04106* (2013.01)

(58) Field of Classification Search
CPC ...... G06F 3/044; G06F 3/0414; G06F 3/0412; G06F 2203/04106
See application file for complete search history.

(56) References Cited

U.S. PATENT DOCUMENTS

| | | | |
|---|---|---|---|
| 8,305,358 B2 | 11/2012 | Klinghult et al. | |
| 8,614,666 B2 | 12/2013 | Whitman et al. | |
| 8,988,384 B2 | 3/2015 | Krah et al. | |
| 9,070,648 B2 | 6/2015 | de Jong et al. | |
| 2008/0170043 A1* | 7/2008 | Soss ............... | G06F 3/0414 345/173 |
| 2010/0123686 A1 | 5/2010 | Klinghult et al. | |
| 2010/0289772 A1 | 11/2010 | Miller | |
| 2011/0096025 A1 | 4/2011 | Slobodin et al. | |

(Continued)

FOREIGN PATENT DOCUMENTS

EP 0531815 A1 3/1993
KR 20140072888 A 6/2014

OTHER PUBLICATIONS

PCT/US2017/019865, International Search Report and Writtten Opinion dated May 25, 2017, consists of 16 pages.

(Continued)

*Primary Examiner* — Yaron Cohen
(74) *Attorney, Agent, or Firm* — Patterson + Sheridan, LLP

(57) ABSTRACT

Embodiments described herein include an input device and associated processing system for sensing force applied by input objects. The input device comprises a display device comprising a plurality of layers formed as a display stack, the display stack including a top surface. The input device further comprises one or more strain gauges disposed within the display stack and configured to detect force applied to the top surface, and a processing system configured to perform display updating using the display device and to perform force sensing using the one or more strain gauges.

22 Claims, 8 Drawing Sheets

(56) References Cited

U.S. PATENT DOCUMENTS

| | | | |
|---|---|---|---|
| 2012/0026120 A1 | 2/2012 | Kuo et al. | |
| 2012/0293451 A1* | 11/2012 | Van Schyndel | G06F 1/1643 345/174 |
| 2013/0009905 A1* | 1/2013 | Castillo | G06F 3/044 345/174 |
| 2013/0068038 A1 | 3/2013 | Bolender et al. | |
| 2014/0216174 A1 | 8/2014 | Aberg et al. | |
| 2015/0185476 A1* | 7/2015 | Lee | G02B 27/017 345/8 |
| 2016/0041672 A1* | 2/2016 | Hoen | G06F 3/041 345/173 |

OTHER PUBLICATIONS

PCT/US2017/019865, Preliminary Report on Patentability dated Oct. 4, 2018, consists of 12 pages.

* cited by examiner

FORCE SENSING WITHIN DISPLAY STACK

CROSS REFERENCE TO RELATED APPLICATIONS

This application claims benefit of U.S. provisional patent application Ser. No. 62/312,894, filed Mar. 24, 2016 entitled "Force Sensing Within Display Stack," which is herein incorporated by reference.

BACKGROUND

Field of the Disclosure

Embodiments of the present disclosure generally relate to techniques for sensing force applied by input objects for an input device comprising a display device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is an input device for sensing force applied by input objects. The input device comprises a display device comprising a plurality of layers formed as a display stack, the display stack including a top surface. The input device further comprises one or more strain gauges disposed within the display stack and configured to detect force applied to the top surface, and a processing system configured to perform display updating using the display device and to perform force sensing using the one or more strain gauges.

Another embodiment described herein is a processing system for an input device with an integrated display device, the input device comprising one or more strain gauges configured to sense force applied by input objects. The processing system comprises a display driver module comprising circuitry configured to update the display device and a capacitive sensing module comprising circuitry configured to operate a plurality of sensor electrodes of the input device to acquire capacitive sensing data. The processing system further comprises a force sensing module comprising circuitry configured to acquire force sensing data using the one or more strain gauges. The one or more strain gauges are formed using one or more sensor electrodes selected from the plurality of sensor electrodes, and wherein the selected one or more sensor electrodes are configured to perform force sensing and capacitive sensing.

Another embodiment described herein is a display device comprising a plurality of layers formed as a display stack, the display stack including a top surface. The display device further comprises a plurality of display electrodes disposed within the display stack and configured to be driven by a processing system to perform display updating. The display device further comprises one or more strain gauges disposed within the display stack and configured to detect force applied to the top surface based on signals driven by the processing system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
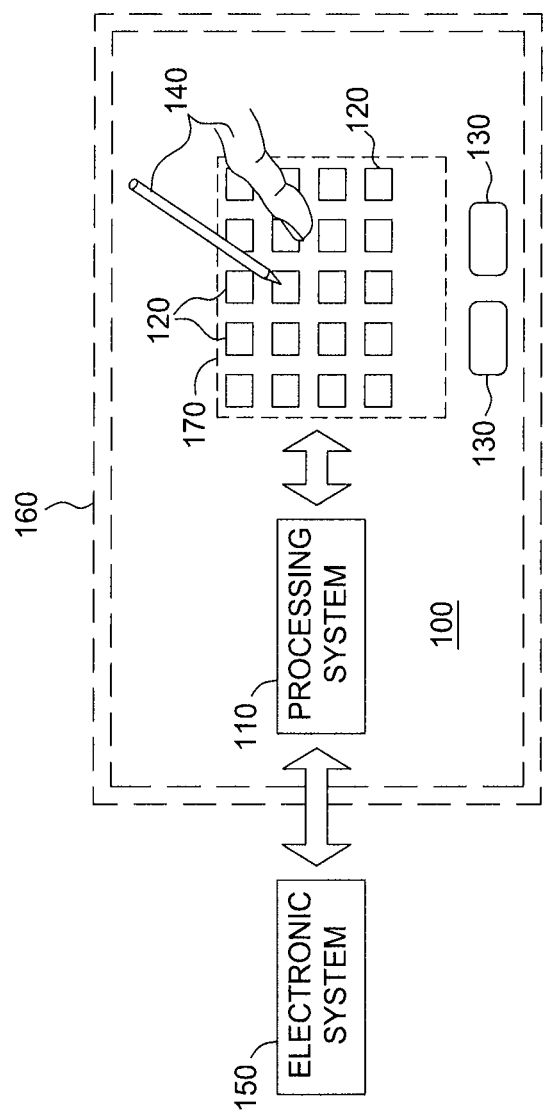
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present technology provide input devices and methods for improving usability. An input device may include electrodes that are operated as sensor electrodes to detect interactions between the input device and an input object (e.g., a stylus or a user's finger). The input device may further include one or more strain gauges for measuring forces applied during interactions with input objects. The acquired force sensing data can be used to validate acquired capacitive sensing data, to discern the intent of the user applying the force, to perform different functions, and so forth. Further, the strain gauges used for force sensing may be integrated into an existing display stack structure, which mitigates certain challenges faced using other force sensing techniques. For example, integrated force sensing can often be accomplished without introducing significant additional thickness or complication to the manufacture and assembly processes for the input device. Additionally, the strain gauges can be grouped into bridges to provide a more linear force response.

FIG. 1 is a schematic block diagram of an input device 100, in accordance with embodiments of the present technology. Although the illustrated embodiments of the present disclosure are shown as being integrated with a display device 160, it is contemplated that the disclosure may be embodied in input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular, circular, or similar shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. The baseline may be obtained when no input objects are determined to be in the sensing region. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Sensor Electrode Arrangements

Figure 2A:
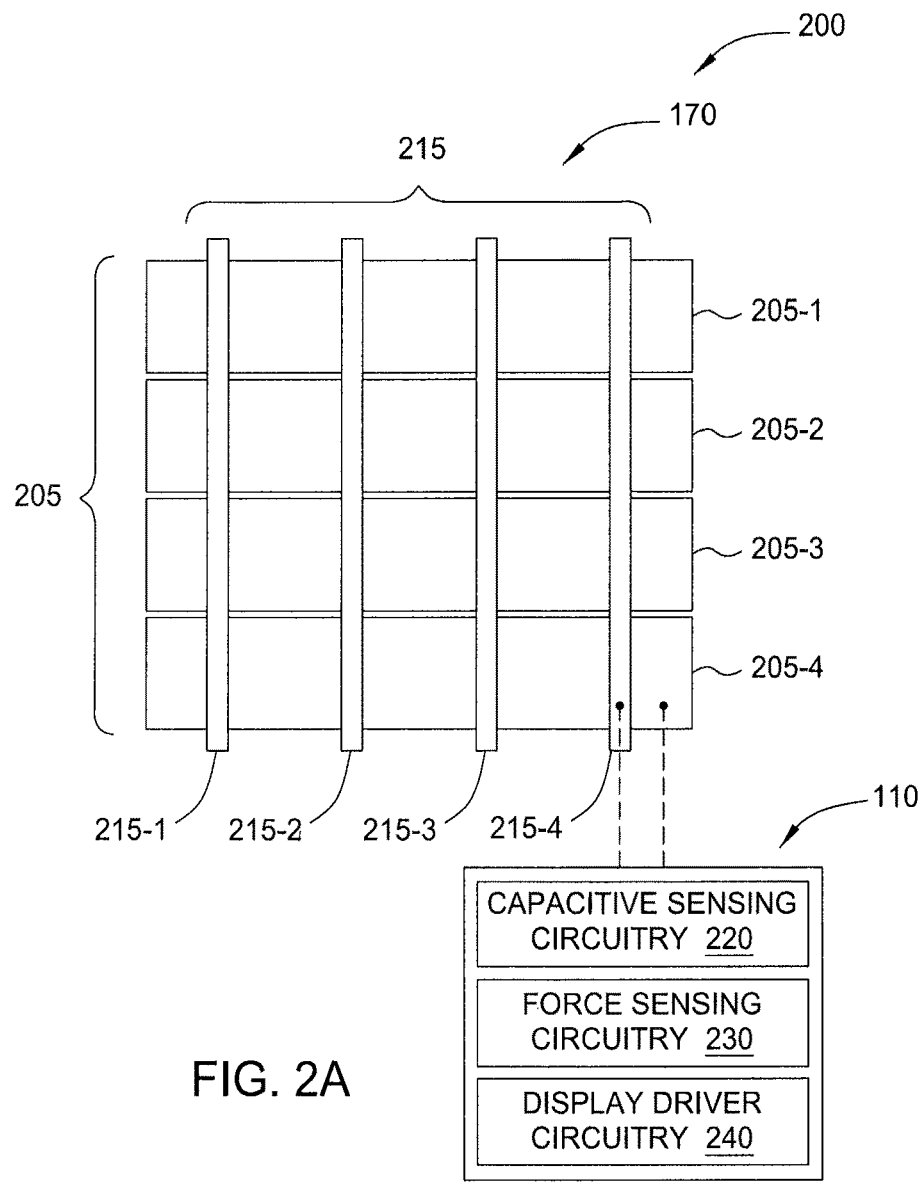
FIGS. 2A, 2B, and 3 illustrate portions of exemplary sensor electrode arrangements, according to embodiments described herein.
Figure 2B:
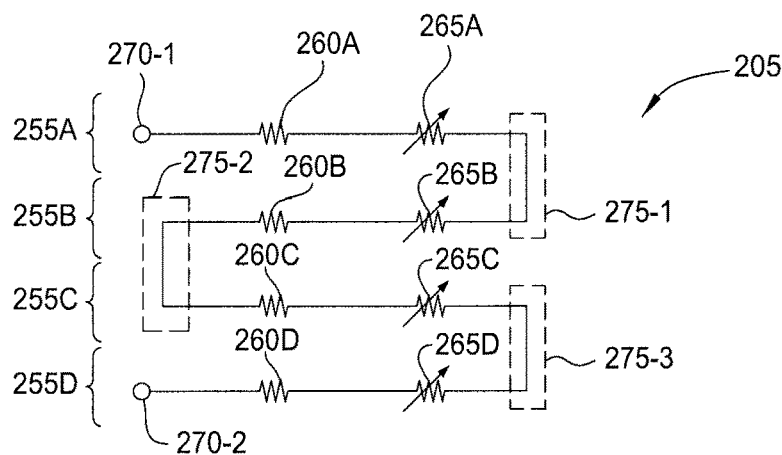
Figure 3:
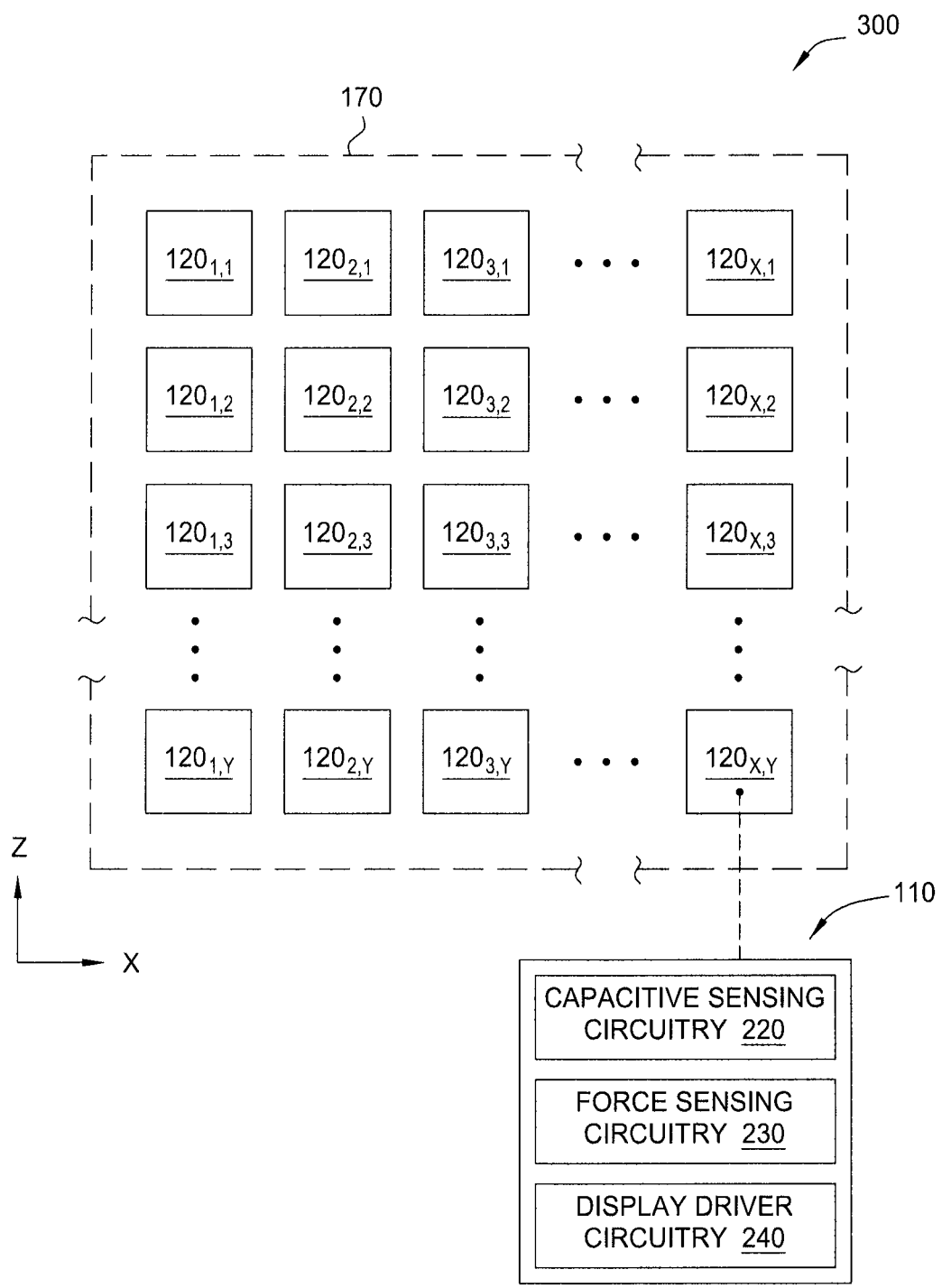

FIGS. 2A, 2B, and 3 illustrate portions of exemplary sensor electrode arrangements, according to embodiments described herein. Specifically, sensor electrode arrangement 200 (FIG. 2A) illustrates a portion of a pattern of sensor electrodes configured to sense in a sensing region 170 associated with the pattern, according to several embodiments. For clarity of illustration and description, FIG. 2A shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4) disposed over the plurality of sensor electrodes 205. The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

In some embodiments, the pluralities of sensor electrodes 205, 215 may be operated for position sensing (capacitive) and for force sensing. For example, a particular sensor electrode 205, 215 operated as a capacitive sensing electrode may be modulated relative to system ground or other reference voltage for performing capacitive sensing, and the sensor electrode 205, 215 may also have a current flowing through it to measure change related to strain from the force applied by an input object.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

Furthermore, in some embodiments, some or all of the sensor electrodes 205, 215 may individually comprise a plurality of smaller electrodes. FIG. 2B illustrates an exemplary sensor electrode 205 comprising a plurality of electrode segments 255A-255D. Each electrode segment 255A, 255B, 255C, 255D comprises a respective resistance 260 and variable resistance 265. For example, electrode segment 255A comprises a resistance 260A and variable resistance 265A. The processing system 110 connects with sensor electrode 205 at a first node 270-1 of electrode segment 255A, and at a second node 170-2 of the electrode segment 255D. The electrode segment 255A is coupled with the electrode segment 255B at connection 275-1. Likewise, electrode segments 255B, 255C are coupled at connection 275-2, and electrode segments 255C, 255D are coupled at connection 275-3.

The variable resistances 265A, . . . , 265D are configured to change when the corresponding sensor electrode segment 255A, . . . , 255D is deformed. In some embodiments, the resistances 260A, . . . , 260D and/or variable resistances 265A, . . . , 265D are configured to correspond to a predefined force range, e.g., a maximum amount of deformation that can be sensed when a force is applied to the input surface. The resistances 260A, . . . , 260D and/or variable resistances 265A, . . . , 265D may be controlled through material selection and/or patterning techniques. For example, the resistances 260A, . . . , 260D and/or variable resistances 265A, . . . , 265D can be controlled by changing a size, length, width, and/or shape of the sensor electrode 205. In some embodiments, the sensor electrode 205 is comprised of indium tin oxide (ITO), but other materials are also possible. Further, the sensor electrode 205 may comprise different materials in different regions, e.g., in different electrode segments 255A, . . . , 255D.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

The processing system 110 is coupled with sensor electrodes 205, 215 and includes capacitive sensing circuitry 220, force sensing circuitry 230, and display driver circuitry 240. The capacitive sensing circuitry 220 includes circuitry configured to drive at least one of the sensor electrodes 205, 215 for capacitive sensing during periods in which input sensing is desired. In one embodiment, the capacitive sensing circuitry 220 is configured to drive a modulated signal onto the at least one sensor electrode 205, 215 to detect changes in absolute capacitance between the at least one sensor electrode and an input object. In another embodiment, the capacitive sensing circuitry 220 is configured to drive a transmitter signal onto the at least one of the sensor electrodes 205, 215 to detect changes in a transcapacitance between the at least one sensor electrode 205, 215 and another sensor electrode 205, 215. The modulated and transmitter signals are generally varying voltage signals comprising a plurality of voltage transitions over a period of time allocated for input sensing.

The force sensing circuitry 230 includes circuitry configured to drive signals across one or more strain gauge elements and measure the resulting signals to acquire force sensing data. For example, a voltage may be driven across the sensor electrodes in a half-bridge configuration, and the voltage is measured at the middle of the half-bridge. For resistive implementations of the strain gauges, the resistance of the strain gauges changes depending on the amount and location of applied force. Thus, resistance measurements may be used to determine the amount and/or location of applied forces. Other implementations of strain gauges are possible. In an optical implementation, the strain gauges may exhibit polarization or inference fringes when force is applied, and these may be measured and assessed to determine the amount and/or location of applied forces.

The acquired force sensing data may provide additional input information to processing system 110. In some embodiments, the force sensing data can be used to validate capacitive sensing data acquired by the capacitive sensing circuitry 220. In one example, the processing system 110 may use the force sensing data to determine the accuracy of touch locations determined by using capacitive sensing data, or vice versa. In some embodiments, the force sensing data can be used to discern the intent of the user applying the force. In one example, the processing system 110 determines whether a detected touch event was intentional or merely incidental—and whether the touch should be treated as valid input—based on the amount of applied force (e.g., a light touch of one part of the user's hand may be determined incidental where another part of the user's hand is providing a more forceful input). In some embodiments, the force sensing data can be used to perform different functions, activate different user interface (UI) elements, etc. depending on the amount of applied force. For example, a light press at a UI element may cause a first function to be performed, while a stronger press may cause a second function to be performed. In some embodiments, the force sensing data may be used to wake at least a portion of processing system 110 out of a predefined low power state, such as a snooze or sleep mode. For example, the force sensing data may be used to wake a capacitive sensing circuitry 220 of the processing system 110. In other embodiments, the force sensing data may be used to wake a display driver circuitry 240 and/or a capacitive sensing circuitry 220.

In some embodiments, the strain gauges are discrete elements that are separate from the sensor electrodes 205, 215. In other embodiments, the strain gauges may additionally or alternatively use one or more of the sensor electrodes 205, 215. As shown, each of sensor electrodes 205, 215 projects significantly along a long axis, which makes the sensor electrodes 205, 215 more sensitive to strain in the respective long axis direction. Additional detail regarding construction of the strain gauges is included with the discussion of FIG. 4 and following.

In some embodiments, the force sensing circuitry 230 and capacitive sensing circuitry 220 share at least some circuitry. For example, the force sensing circuitry 230 and capacitive sensing circuitry 220 may share one or more analog front ends (AFEs) for acquiring and/or processing sensing data. The AFEs used for capacitive sensing may be shared where the strain gauges associated with the AFE are manufactured with a suitable dynamic range (e.g., a bridge resistance offset variation of about 1%) and gauge factor (e.g., ~2 or more). Alternatively, some AFEs or other receiver circuitry such as amplifiers may be designated for force sensing and not used for touch sensing.

The display driver circuitry 240 may be included in or separate from the processing system 110. The display driver circuitry 240 includes circuitry configured to provide display image update information to the display of the display device 160. The display update periods may be non-overlapping with capacitive sensing and/or force sensing periods In one embodiment, the processing system 110 comprises a first integrated controller circuit comprising the display driver circuitry 240 and at least a portion of the capacitive sensing circuitry 220 (e.g., a transmitter module and/or receiver module). In another embodiment, the processing system 110 comprises a first integrated controller circuit comprising the display driver circuitry 240 and a second integrated controller circuit comprising the capacitive sensing circuitry 220. In yet another embodiment, the processing system comprises a first integrated controller circuit comprising display driver module 320 and a first portion of the capacitive sensing circuitry 220 (e.g., one of a transmitter module and a receiver module) and a second integrated controller circuit comprising a second portion of the capacitive sensing circuitry 220 (e.g., the other one of the transmitter and receiver modules). In various embodiments, the force sensing circuitry 230 may be included with the capacitive sensing circuitry 220 in one or multiple integrated controller circuits of the processing system 110. In other embodiments, a portion or the entire force sensing circuitry 230 may be included in a separate integrated controller circuit from the capacitive sensing circuitry 220. In those embodiments comprising multiple integrated controller (IC) circuits, a synchronization mechanism may be coupled between the ICs (e.g., an electrical signal on a connecting wire and a shared clocking signal), configured to synchronize display updating periods, capacitive and/or force sensing periods, transmitter signals, display update signals, and the like.

In some embodiments, capacitive sensing may occur during periods that are at least partially overlapping with display updating periods. For example, as a common electrode is driven for display updating, the common electrode may also be driven for capacitive sensing. In other embodiments, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods. Further, the non-display update period may also be at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between capacitive sensing circuitry 220 and display circuitry 240 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The capacitive sensing circuitry 220 includes circuitry configured to receive resulting signals with the sensor electrodes 120. The sensor module 310 may determine a position of the input object in the sensing region 170 or may provide a signal including information indicative of the resulting signal to another module or processor, for example, a determination module or a processor of an associated electronic device 150 (i.e., a host processor), for determining the position of the input object in the sensing region 170.

In some embodiments, force sensing may occur during periods that are at least partially overlapping with display updating periods and/or capacitive sensing periods. For example, force sensing may be performed during display updating periods as the strain gauges are disposed away from the display region of a display device, such that force measurements are less affected by capacitive coupling of display update signals on display electrodes. In some embodiments, force sensing is performed overlapping with capacitive sensing. In other embodiments, force sensing is performed during non-display updating periods, but during periods separate from capacitive sensing periods.

Sensor electrode arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable arrangement. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, ..., $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the sensor electrode arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, . . . , $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., sensor electrode arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme. Further, coded signals may be used to simultaneously transmit and receive independent measurements between multiple transmitters and at least one receiver for capacitive sensing and/or strain gauge sensing.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In an alternative embodiment, the resulting signals may be demodulated at different phases (e.g., sine and cosine phases) and/or polarities (e.g., positive and negative polarities) to distinguish the contributions from different transmitter signals and/or from interfering signals. The resulting signals received from the sensor electrodes may be summed together, which may be done before or after processing of the resulting signals' data.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In an exemplary interference measurement mode, there is no modulation performed on the sensor electrodes 120 (i.e., the sensor electrodes 120 are held at a substantially constant voltage), while receiving resulting signals with all or a portion of the sensor electrodes 120. The resulting signals may be used to measure interference. Further, a sensing frequency (e.g., carrier signal frequency) may be adjusted based on the measured interference.

In various embodiments, processing system 110 may be configured to selectively shield at least a portion of sensor electrodes 120 and to selectively shield or transmit with the grid electrode(s) 122 while selectively receiving and/or transmitting with other sensor electrodes 120. In some embodiments, a switching mechanism may be configured to guard using sensor electrodes 120 that are not connected to receivers of the processing system 110.

In some embodiments, the modulation of a sensor electrode 120 for performing absolute capacitance may be provided by modulation of the power supply for the display device and/or sensing device, relative to a system power supply voltage such as ground. By modulating the power supply of the display device, all of the driven voltages in the display device are modulated, causing the elements of the display device to be guarded during periods of capacitive sensing. In such an embodiment, the modulation used can be similar to the modulation driven on a sensor electrode 120 for capacitive sensing.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move a host IC out of a "doze" mode or low-power mode. The coarse capacitive image may correspond to the entire sensor area or only to a portion of the sensor area. The processing system 110 may reenter the low-power mode upon determining an input object has left the sensing region 170 and/or after a predetermined period of time.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between a sensor electrode and another sensor electrode or at least one other electrode within the input device (e.g., strain-sensing electrodes, display electrodes), where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the capacitive sensing circuitry 220 of processing system 110 includes circuitry configured to drive at least one of the sensor electrodes 120 for capacitive sensing during periods in which input sensing is desired. In one embodiment, the capacitive sensing circuitry 220 is configured to drive a modulated signal onto the at least one sensor electrode 120 to detect changes in absolute capacitance between the at least one sensor electrode and an input object. In another embodiment, the capacitive sensing circuitry 220 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The capacitive sensing circuitry 220 may be selectively coupled one or more of the sensor electrodes 120 and/or the grid electrode(s). For example, the capacitive sensing circuitry 220 may be coupled selected portions of the sensor electrodes 120 and operate in either an absolute or transcapacitive sensing mode. In another example, the capacitive sensing circuitry 220 may be a different portion of the sensor electrodes 120 and operate in either an absolute or transcapacitive sensing mode. In yet another example, the capacitive sensing circuitry 220 may be coupled to all the sensor electrodes 120 and operate in either an absolute or transcapacitive sensing mode.

The capacitive sensing circuitry 220 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

Force Sensing within Display Stack

Figure 4:
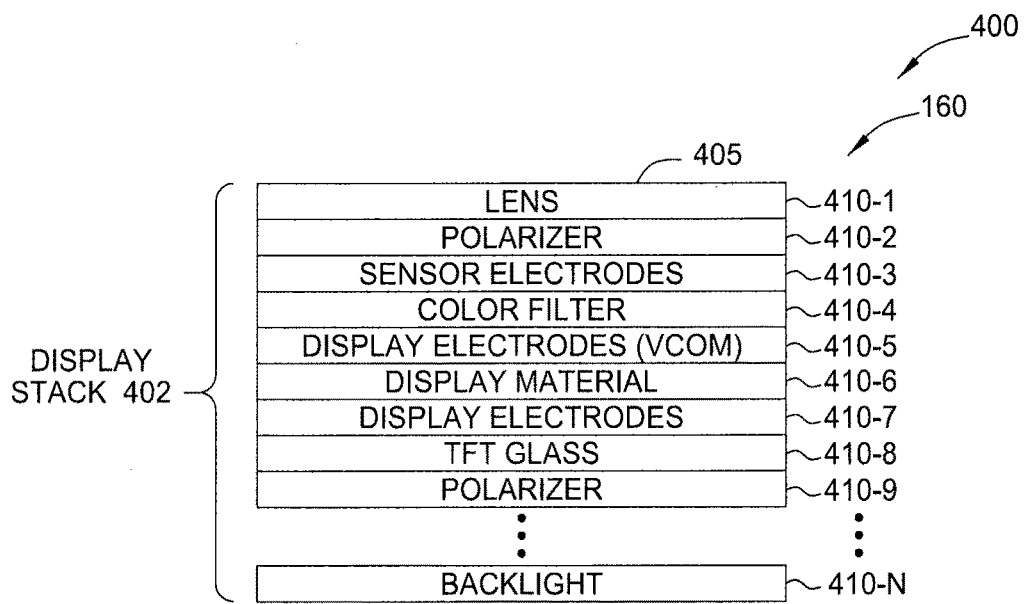
FIG. 4 illustrates an exemplary arrangement of a plurality of layers forming a display stack of a display device, according to embodiments described herein.

FIG. 4 illustrates an exemplary sensor electrode arrangement of a plurality of layers forming a display stack of a display device, according to embodiments described herein. More specifically, FIG. 4 provides a cross-section view of a sensor electrode arrangement 400, which includes a plurality of layers 410 (i.e., 410-1, 410-2, ..., 410-N) included within a display stack 402 of display device 160. The display stack 402 has a top surface 405, at or near which interaction with input devices occurs.

As shown, the plurality of layers 410 of display stack 402 comprises a lens layer 410-1, polarizer layer 410-2, sensor electrodes layer 410-3, color filter layer 410-4, display electrodes layer 410-5 corresponding to Vcom electrodes, display material layer 410-6, display electrodes layer 410-7, thin-film transistor (TFT) glass layer 410-8, polarizer layer 410-9, and backlight layer 410-N. In some OLED implementations, the TFT glass layer 410-8 may be replaced with a flexible material layer. Further, some OLED implementations may selectively emit different colors, such that the color filter layer 410-4 is not required. The thicknesses of the various layers 410 are not drawn to scale; for example, the sensor electrodes included in sensor electrode layer 410-3 may be relatively thin and deposited on a relatively thick substrate, e.g., a glass substrate included as part of color filter layer 410-4. The depicted sensor electrode arrangement 400 of display stack 402 is meant as one non-limiting example, as suitable alternate arrangements of display stack 402 can include more or less layers, may arrange the layers with a different order, etc. The sensor electrode layer 410-3 may be disposed in an alternate location, e.g., between color filter layer 410-4 and TFT glass layer 410-8. For example, the sensor electrode layer 410-3 can be disposed on a bottom surface of the lens layer 410-1 (i.e., between lens layer 410-1 and polarizer layer 410-2). While display stack 402 generally depicts a vertically-aligned display device 160, other types of display devices are possible. For example, an in-plane switching (IPS) or fringe-field switching (FFS) display device 160 may include display material layer 410-6 arranged above the display electrodes layers 410-5, 410-7. Some embodiments may include additional layers that are not depicted, such as a stiffening layer beneath polarizer layer 410-9.

According to embodiments described herein, one or more strain gauges may be disposed within the display stack 402, e.g., at an interface between two adjacent layers 410. For resistive implementations, the strain gauges can be made of a metal (e.g., aluminum, copper), transparent conductors (e.g., indium tin oxide (ITO)), semiconductors (e.g., amorphous silicon (a-Si), low-temperature polysilicon (LTPS), indium gallium zinc oxide (IGZO)), and so forth. In some cases, the material forming the strain gauges is piezoresistive or piezoelectric. The selected material for the strain gauges can be deposited onto a particular layer 410, such as the TFT glass layer 410-8, or attached to a particular layer 410 using a film, such as the polarizer layer 410-2. The strain gauges may be disposed in areas having relatively concentrated bending strain, such as at lateral edges of the display stack 402 where supporting members concentrate bending strain when a user applies force near the top surface 405.

The force measurement values that are measured by the strain gauges may be used by a user interface (UI) implemented in a processing system (e.g., processing system 110 of FIG. 1). For example, the force measurement values can be combined with touch or press measurements to estimate force and/or pressure at one or more touch locations. In this way, the user's intent can be better determined and the user interface design can be made more robust, intuitive, and effective. In some embodiments, the force measurement values may be used to control operation of the processing system. For example, the force measurement values can be used to wake up the touch sensing or display from a low-power "sleep" mode, or to activate a UI press-mode.

Integrating force sensing by including strain gauges within the existing display stack 402 mitigates certain challenges faced using other techniques for force measurement. For example, other force sensing implementations may require adding one or more layers and/or air gaps to the display stack 402, introducing significant thickness and complicating the manufacturing and assembly processes. For example, force sensors configured to detect changes as sensor electrodes move closer to each other could be used to detect changes in transcapacitance or absolute capacitance. Also, many alternate force sensing designs may increase cost as additional layers/electrodes are included.

Moreover, certain other force sensing implementations (e.g., parallel plate capacitive) may have a less linear response depending on the amplitude or location of applied force, which in turn requires larger deflections, larger forces, and/or a greater sensitivity (or dynamic range). Integrating strain gauges into the display stack 402 between the lens layer 410-1 and above the backlight layer 410-N provides a simpler integration and yield higher performance force sensing.

Force sensing capability can also be integrated into an alternate arrangement of display stack 402 having sensor electrodes configured for capacitive sensing included between color filter layer 410-4 and TFT glass 410-8 (also referred to as an "in-cell" implementation, "full in-cell," etc.), and/or into an integrated display solution without requiring additional components and only few additional connections. The sensor electrodes may alternately be included on top of the color filter layer 410-4 (i.e., between color filter layer 410-4 and polarizer layer 410-2).

Figure 5:
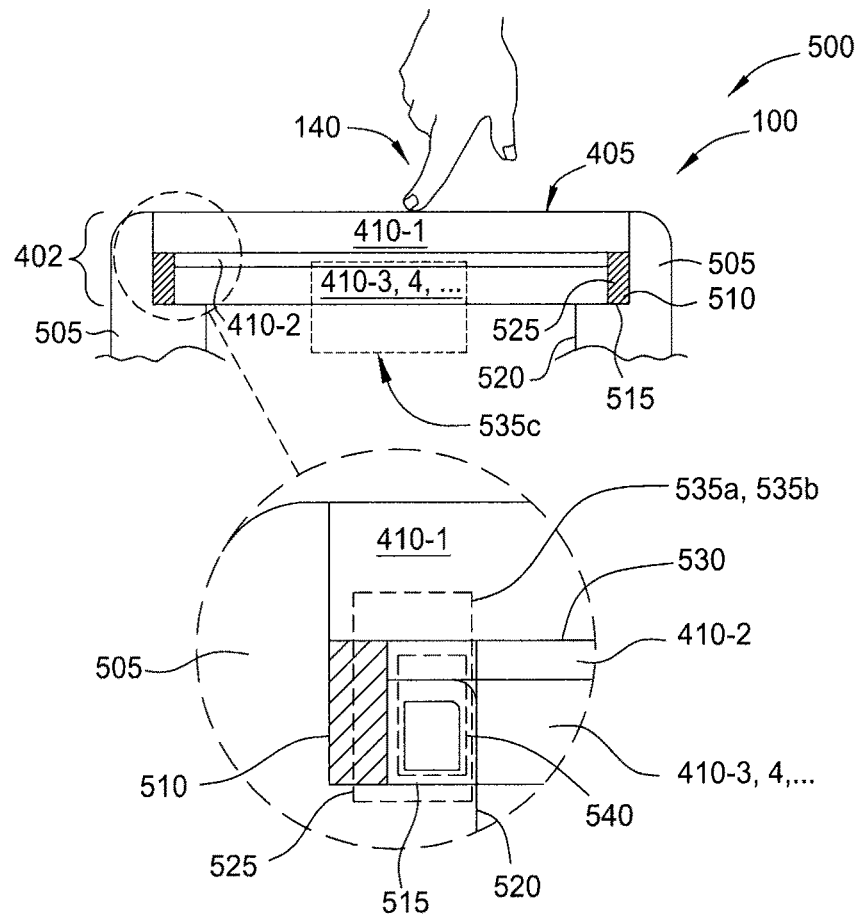
FIGS. 5 and 6 illustrate exemplary interfaces of multiple layers of the display stack, according to embodiments described herein.
Figure 6:
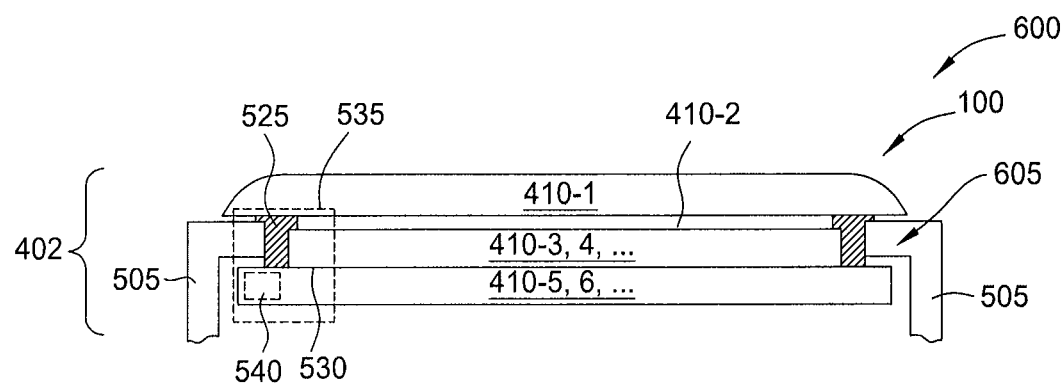

FIGS. 5 and 6 illustrate exemplary interfaces of multiple layers of the display stack, according to embodiments described herein. More specifically, FIG. 5 illustrates a cross-section view of one arrangement 500 of input device 100. Arrangement 500 shows a plurality of layers 410 of a display stack 402 and supporting members 505 configured to support the display stack 402 near lateral edges of the layers 410. The supporting members 505 may be part of a larger support structure, such as a single support ring that circumscribes the display region of the display device. Additionally, supporting members 505 may include a sealing area enclosing a display material layer (e.g., protecting a liquid crystal of the display stack 402) or an encapsulation ring area (e.g., material separating an OLED display stack 402 from environmental issues).

The lens layer 410-1 is seated laterally against a first edge 510 of the supporting member 505. When the display stack 402 is seated against the supporting members 505, the lens layer 410-1 (or alternate top-most layer) and portions of the supporting members 505 can form a substantially continuous surface including the top surface 450 of the display stack 402. The lens layer 410-1 generally operates to seal the display stack 402 from foreign material around the edge. A number of layers are disposed beneath lens layer 410-1 (i.e., at a reverse surface from the top surface 405) and may be seated against a second edge 515 of the supporting members 505. In some cases, the layers beneath the lens layer 410-1 have a lesser areal extent than the lens layer, such that the layers beneath the lens layer 410-1 that seat against the second edge 515 (as shown, layers 410-2, 410-3, 410-4, etc.) form a staggered interface 530 with the lens layer 410-1. Mechanically, the lens layer 410-1 tends to provide the dominant stiffness within the display stack 402. Thus, the stack of layers determines (by the relative dimensions and material properties) the stiffness and strain concentration when a force is applied to the lens layer 410-1.

When the display stack 402 is seated against the support member(s) 505, the staggered interface 530 with the support members 505 forms a cavity 525 (shown as hatched). When input device 140 deflects the display stack 402 by touching the top surface 405, the strain is relatively concentrated at the staggered interface 530 compared to other locations on the layers 410. Therefore, placing one or more strain gauges 540 (shown as an outlined area) in proximity of the staggered interface 530, such as within a region 535a, 535b near lateral supporting edges of the layers 410, can provide strain data having greater resolution for force sensing due to strain concentration. Fully-supported corners of the lens layer 410-1 (e.g., region 535b) are constrained and may have lower shear. Areas near the middle of the supporting edges (e.g., region 535a) may have a substantially constant strain for a given force. Areas in the middle of the supported display stack area (e.g., region 535c) may have uniform strain.

Certain display implementations, such as an OLED or LCD can be formed as part of a flexible membrane (e.g., having a laminated glass or plastic lens layer 410-1) that deflects under force while it is supported at the edges. Further, some display implementations may include a flex circuit layer that provides support to the side edges of a display. The flex circuit layer may be constructed of any suitable flexible material, such as polyimide or polyethylene terephthalate (PET), and attached with the display stack 420 by an anisotropic conductive film (ACF) and/or a structural adhesive. In some embodiments, the strain gauge(s) 540 are disposed on the flex circuit layer and detect force on the flex circuit layer, but route the force sensing signals through one or more other (e.g., through the TFT glass layer 410-8) layers to the processing system 110.

The strain gauges 540 can be mounted alternately on other substrates within the display stack 402 and connected with a touch and/or force sensing controller circuit, which may also include a timing controller and/or other display processing capabilities.

The strain gauges 540 may be placed at locations that optimize the strain response to force and deflection. The center of an edge-supported membrane exhibits a relatively constant curvature, whereas support locations having a transition from relatively stiff to relatively flexible may focus strain at the support locations. Further, fully-supported corners have relatively lower bending strain. Thus, thinning or stiffening of local areas to concentrate strain, and/or creating regions of smooth transitions (e.g., radius cuts) to prevent cracking of one or more layers can improve performance and reliability. For example, the supporting members 505 may be located at corners of the display stack 402 and the display stack 402 may have a greater thickness at its outer edge (interfacing with the supporting members 505) for increased stiffness and reduced local bending.

In some embodiments, the supporting members 505 can pre-load the display stack 402 to deflect toward the user input such that applied force reduces strain measured by the strain gauges. Such an implementation of the display stack 402 with integrated force sensing can have a more simple assembly, as deflection of the display stack 402 into a recessed area behind the display stack 402 may be reduced or entirely removed. The supporting members 505 may be further configured to restrain the display stack 402, such that the display stack 402 will not easily separate from the input device 100 once installed (i.e., providing a stronger connection than adhesive alone). FIG. 6 illustrates one example where supporting members 505 restrain the display stack 402. In arrangement 600, the lens layer 410-1 is disposed above the supporting members 505 but one or more layers (here, layers 410-5, 410-6, . . . ) are disposed beneath a projection 605 of the supporting members 505. In alternate arrangement, the lens layer 410-1 and/or other layers 410-2, 410-3, 410-4 may be disposed beneath the projection 605. As in arrangement 500, in arrangement 600 the strain gauges 540 may be disposed within region 535 near the staggered interface 530 to provide better resolution force sensing data. As discussed above, the strain gauges 540 may be arranged near the center of the display stack for a more uniform strain response or in a fully-supported corner with a minimum strain response.

The location of force response in the multiple strain gauges 540 along with determined user input location (e.g., an input object position) can be used to calibrate the estimated force of the user inputs. This may require performing a calibration procedure for a given design or for each sample. Further, non-force responsive gauges may be used for performing temperature and other external factor compensation.

As discussed above, the strain gauges 540 can be disposed at any suitable layer of the display stack 402, such as the TFT glass layer 410-8, or attached to a particular layer 410 using a film, such as the polarizer layer 410-2. In some cases, the TFT glass layer 410-8 may be made larger in order to provide the strain measuring support and capture points. The strain gauges 540 may be disposed over/behind a black mask that partially or fully circumscribes the viewable area of the display, and the supporting members 505 can be at a further lateral extent than the strain gauges 540. For example, a tablet (one example of input device 100) may have a relatively larger support area than a mobile phone (another example).

Figure 7:
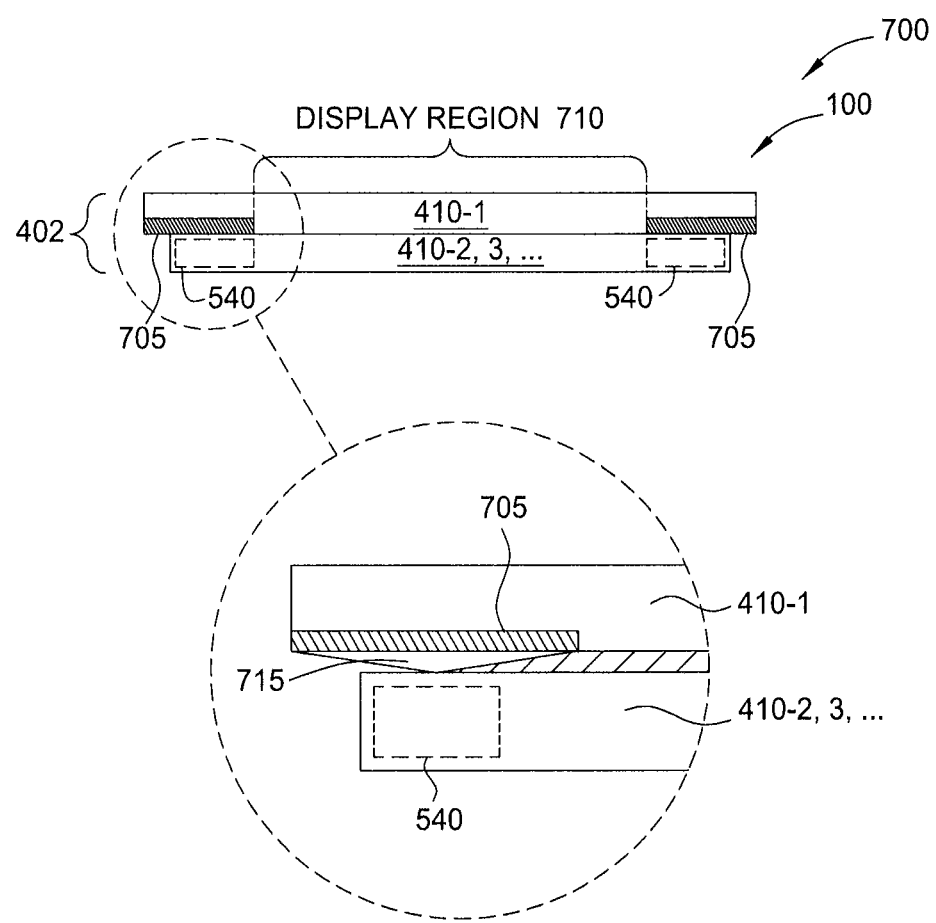
FIG. 7 illustrates an exemplary interface with a layer comprising a strain-concentrating feature, according to embodiments described herein.

FIG. 7 illustrates an exemplary interface with a layer comprising a strain-concentrating feature, according to embodiments described herein. As discussed above, force sensing may be done by measuring the strain at lateral edges of the display stack 402, which can be accomplished through placement of strain gauges 540. In arrangement 700, the strain gauges 540 are placed outside of a display region 710, such as beneath a black mask 705. Although shown within lens layer 410-1, the black mask 705 may alternately be disposed in a different layer (e.g., layer 410-2), may be formed as a separate layer, and so forth. Placing strain gauges 540 outside of the display region 710 may permit a less restrictive construction and connection of the strain gauges 540, since the effect of the strain gauges 540 on viewability of the display is no longer a concern. For example, the strain gauges 540 may be constructed of a preferential conductive material and/or in an arrangement that is not transparent, which ordinarily may not be suitable for use within a display region 710 due to the effects on the viewability of portions of the display region 710.

In arrangement 700, the lens layer 410-1 also includes one or more features 715 disposed at the interface of the lens layer 410-1 with other adjacent layers of the display stack 402. As shown, the feature 715 generally projects out from a lower surface of the lens layer 410-1, having a larger area at the lower surface and a decreased area at the interface with other adjacent layers 410. In some embodiments, around the area of features 715, a compressible or shear strain may be measured instead of a bending strain. Features 715 may have any shape that is suitable for concentrating strain at the interface of the layers, such as one or more points, a ridge, and so forth. As shown, the strain gauges 540 are disposed beneath the interface of feature 715 with adjacent layers 410.

Figure 8:
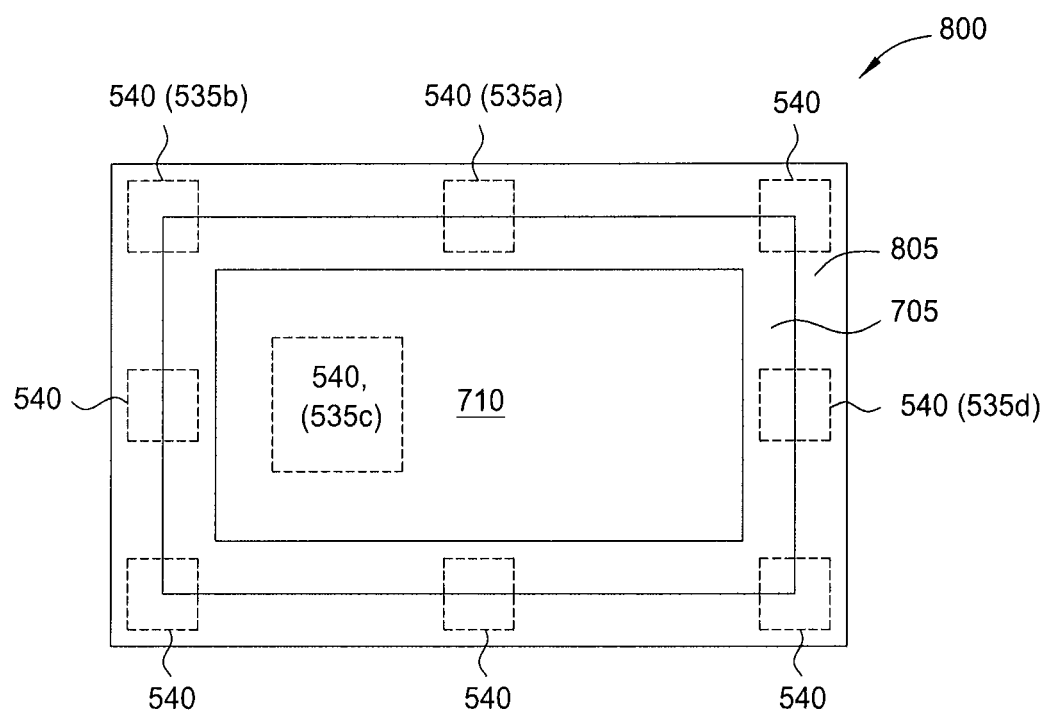
FIGS. 8 and 9 illustrate exemplary arrangements of strain gauges disposed outside the display region of a display device, according to embodiments described herein.
Figure 9:
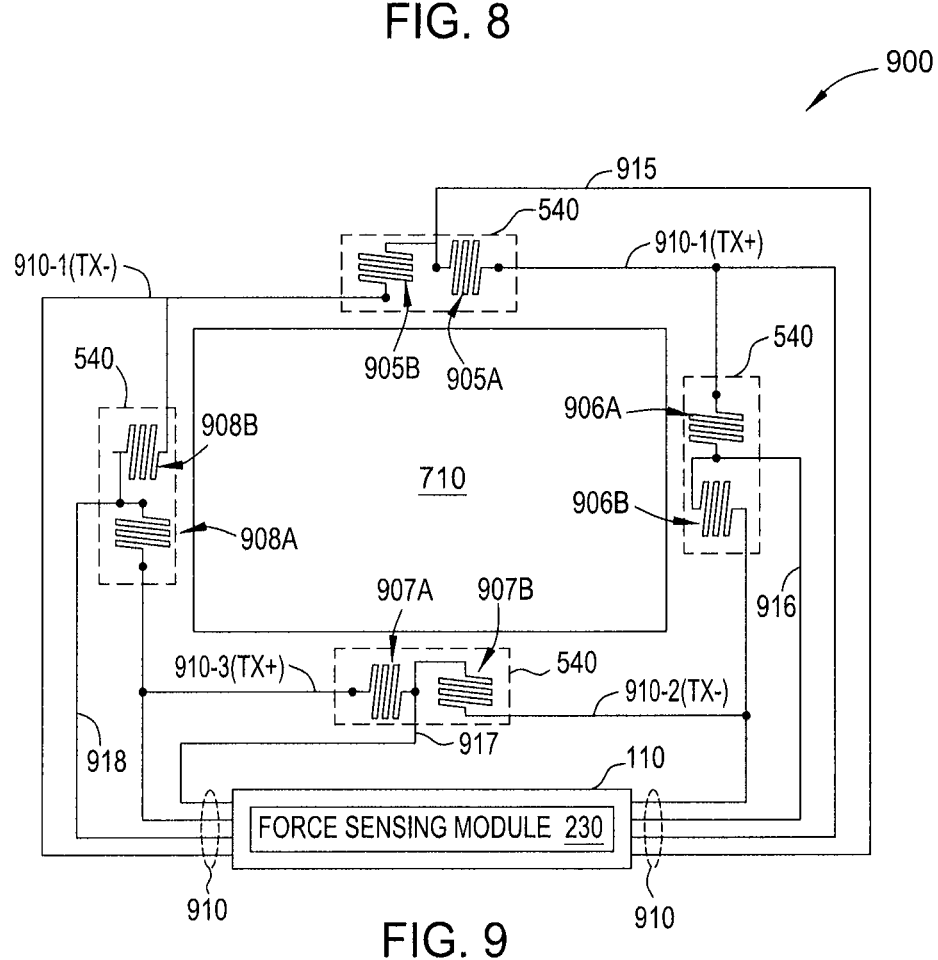

FIGS. 8 and 9 illustrate exemplary arrangements of strain gauges disposed outside the display region of a display device, according to embodiments described herein. In arrangement 800, display area 710 is circumscribed by black mask 705, which is circumscribed by a support ring 805. In an alternate arrangement, the black mask 705 may be integrated within the support ring 805. The strain gauges 540 are located at one or more positions relative to the display region 710, such as at corners and at mid-points along each side of the perimeter of the display region 710. Other configurations of strain gauges 540 are possible, include greater or fewer strain gauges 540 and arrangement in different relative positions. In one example, discrete supporting members are located near the corners of the display stack, and strain gauges 540 may be positioned near the corners to measure the concentrated strain. In another example, the support ring 805 is uniform and the strain may be concentrated near the midpoints of each side of the display stack.

The amount of deflection required can be reduced by adding stiffening elements, which can also concentrate strain in desired locations. In some cases it may be easier to use thin or flexible displays (e.g., OLED) since flexible displays tend to concentrate strain at their support points (where a transition from relatively stiff to flexible occurs). Generally, a thicker lens layer 410-1 (or facesheet) relative to the diagonal dimension of the display stack results in more broad (and less localized) deflection. In some embodiments, as few as four or six strain gauges (e.g., as few as one or two strain gauges 540 along each side of the display stack) can produce suitably high-resolution force sensing data.

The routing between the processing system and the strain gauges 540 may also be disposed outside the display region 710 and under the black mask so that it is not visible. The routing for force sensing in some cases may be on the same layer(s) of the display stack as routing for capacitive sensing. In one embodiment, a pattern for a strain gauge 540 as well as contacts to the strain gauge 540 are formed in a single layer of conductive material. Generally, operating strain gauges 540 comprises transmitting one or more excitation signals and receiving resulting signals using the routing. In some implementations, the electrodes carrying the excitation signals can be shared between different strain gauges 540, reducing the amount of routing and number of contacts required. In some implementations, the routing of electrodes carrying the excitation signals can operate to shield the strain gauge and related electrodes used for measurement, using techniques similar to those described above with respect to capacitive sensing.

Sensor electrode arrangement 900 illustrates a number of strain gauges 540 disposed outside the display region 710. As shown, each strain gauge 540 comprises a first strain gauge 905A, 906A, 907A, 908A and a second strain gauge 905B, 906B, 907B, 908B. The strain gauges 905A-908A, 905B-908B may be comprised of any suitable material, such as metal (e.g., aluminum, copper), transparent conductors (e.g., indium tin oxide (ITO)), semiconductors (e.g., amorphous silicon (a-Si), low-temperature polysilicon (LTPS), indium gallium zinc oxide (IGZO)), and so forth.

The first strain gauges 905A-908A and second strain gauges 905B-908B each have a gauge pattern that is more sensitive to strain along a particular axis (or dimension), which may correspond to an axis of the display stack and/or display region 710. Further, display-integrated strain gauges may be folded in order to reduce length and to optimize strain response in small areas. For example, the first strain gauges 905A, 907A are more sensitive to force along the vertical axis, while the first strain gauges 906A, 908A are more sensitive to force along the horizontal axis. The second strain gauges 905B-908B are generally included to provide more accurate force sensing data by accounting for effects of thermal expansion, manufacturing, etc. at each of the first strain gauges 905A-908A. Each of the second strain gauges 905B-908B generally has the same construction (e.g., same material, gauge pattern) as the corresponding first strain gauge 905A-908A, but is generally oriented transverse or perpendicular to the pattern of the corresponding first strain gauge 905A-908A so as to be negligibly affected by force sensed by the corresponding first strain gauge 905A-908A.

In some embodiments, at least one strain gauge bridge is formed using certain ones of the first strain gauges 905A-908A and second strain gauges 905B-908B. Strain gauge bridges generally provide an increased resolution of force sensing by accounting for temperature and manufacturing effects. In another embodiment, three strain gauges may be used at relative 120-degree phases for similar reasons and a larger angular strain resolution. For example, and within each grouping of strain gauge 540, each of the first strain gauges 905A, 906A, 907A, and 908A is coupled with a respective one of the second strain gauges 905B, 9066, 907B, and 908B. These couplings can be used to form half-bridges, full-bridges, etc. to provide force sensing input to the processing system.

Each of the first and second strain gauges 905A-908A, 905B-908B are coupled with a plurality of routing electrodes 910 for receiving excitation signals from the force sensing circuitry 230 and for transmitting resulting signals to the force sensing circuitry 230. The routing electrodes 910 may be routed outside the display region 710, although alternate implementations may include transparent conductors that extend at least partly into the display region 710 or are fully integrated within the display region (e.g., a transmitter electrode). Some of the routing electrodes 910 are driven by the force sensing circuitry 230 with excitation signals used to acquire a resulting force measurement on other routing electrodes 910.

Figure 10:
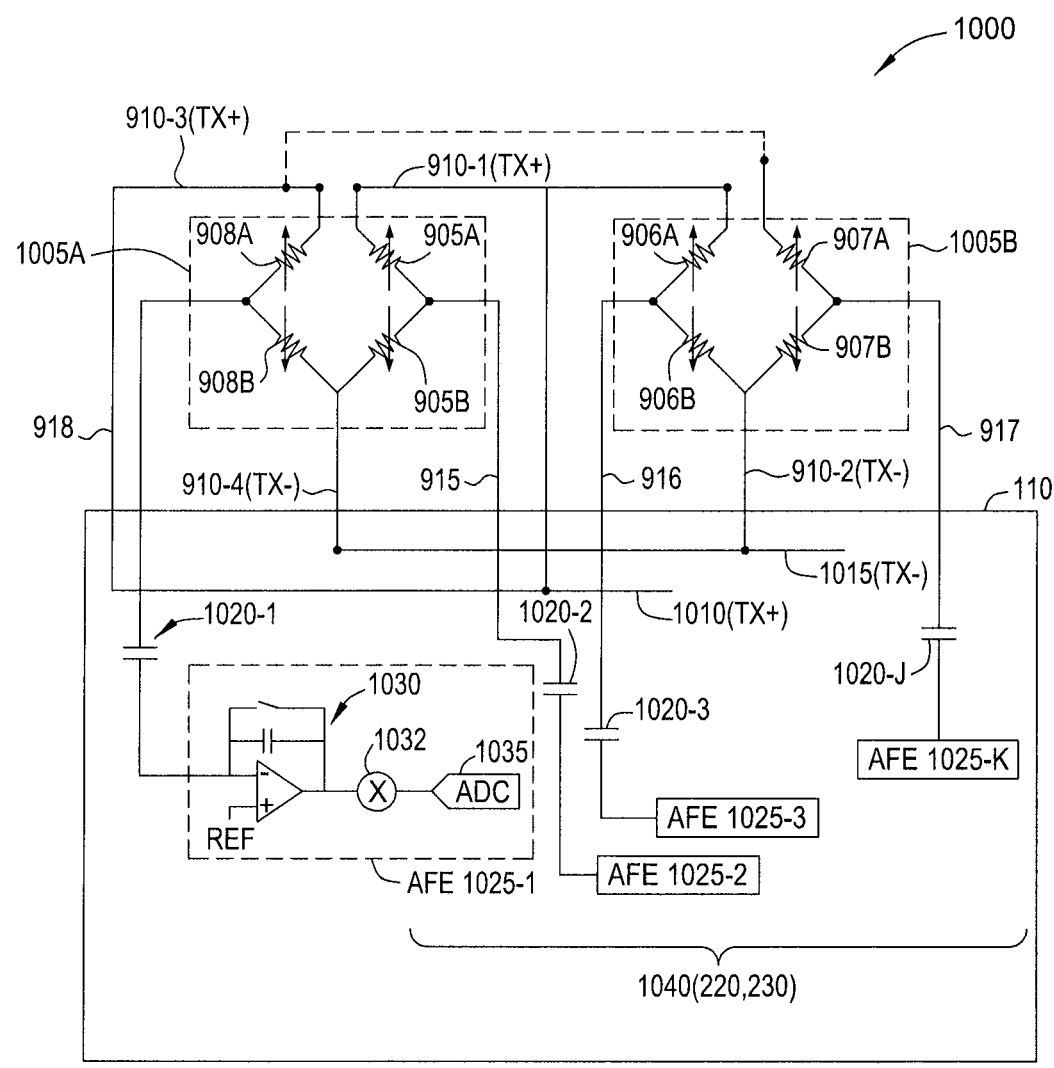
FIG. 10 illustrates an exemplary arrangement of multiple strain gauge bridges coupled with a processing system, according to embodiments described herein.

In some embodiments, one or more routing electrodes are shared by multiple ones of the first and second strain gauges 905A-908A, 905B-908B. In some cases, the one or more shared routing electrodes are shared between multiple strain gauge bridges. Referring to both sensor electrode arrangement 900 of FIG. 9 and sensor electrode arrangement 1000 of FIG. 10, first strain gauges 905A, 908A and second strain gauges 9056, 908B are arranged as a first full-bridge 1005A. The first strain gauges 906A, 907A and second strain gauges 906B, 907B are arranged as a second full-bridge 1005B. In alternate implementations, first and second strain gauges 905A-908A, 905B-908B may be arranged as quarter-bridges, half-bridges, full-bridges, or combinations thereof. The routing electrodes 910-1, 910-3 each carry a first excitation signal TX+ from an internal net 1010 of the processing system 110. The routing electrodes 910-2, 910-4 each carry a second excitation signal TX− from an internal net 1015 of the processing system 110. In some embodiments, the first and second excitation signals TX+, TX− are complementary, providing twice the signal magnitude across strain gauge bridges and an improved force sensing signal-to-noise ratio (SNR). Further, offsets of the receiver circuitry may be calibrated with controlled charge cancellation electronics.

Routing electrode 910-1 couples with first strain gauge 905A of the first full-bridge 1005A, and with first strain gauge 906A of the second full-bridge 1005B. Routing electrode 910-2 couples with second strain gauges 906B, 907B, and routing electrode 910-4 couples with second strain gauges 905B, 908B. Routing electrodes 901-3 couples with first strain gauges 908A and 907A; a portion of the coupling is shown as a dashed line, as further routing may in some cases be necessary to route around other display and/or sensor electrodes coupled with the processing system 110. The routing electrodes 915, 916, 917, 918 are coupled with various ones of the first and second strain gauges 905A-908A, 905B-908B and configured to carry force sensing signals (e.g., modulated voltages proportional to strain differences between different elements of a bridge) to the processing system 110.

Within sensor electrode arrangement 1000, processing system 110 includes a plurality of analog front-ends (AFEs) 1025-1, 1025-2, 1025-3, . . . , 1025-K configured to sample signals and perform various signal processing. The AFEs 1025-1, 1025-2, 1025-3, . . . , 1025-K may be included as a part of capacitive (touch) sensing circuitry 220 (FIGS. 2, 3), of force sensing circuitry 230, and/or may be shared by the different circuitry. As shown, AFE 1025-1 includes an integrator 1030, a mixer 1032, and an analog-to-digital converter (ADC) 1035, although other implementations are possible. Each AFE 1025-1, 1025-2, 1025-3, . . . , 1025-K may be coupled with a routing electrode 915, 916, 917, 918 and configured to receive force sensing signals therefrom.

The AFEs 1025-1, 1025-2, 1025-3, . . . , 1025-K may be coupled with the routing electrodes 915, 916, 917, 918 through capacitances 1020-1, 1020-2, 1020-3, . . . , 1020-J. In some embodiments, an AFE used for capacitive sensing can be capacitively coupled with one or more of the strain gauges 905A-908A, 905B-908B such that it can compensate for strain gauge bridge offsets. By scaling the size of capacitances 1020-1, 1020-2, 1020-3, . . . , 1020-J the strain resolution (e.g., microstrain or µ-strain) of the sensor can be controlled relative to the dynamic range (e.g., limited by the bridge offset ~1% and any offset correction).

In some embodiments, the capacitive sensing circuitry 220 and force sensing circuitry 230 include shared circuitry 1040. For example, the AFEs 1025-1, 1025-2, 1025-3, . . . , 1025-K used for performing force sensing may also be used for capacitive sensing if the strain gauges are have a sufficient dynamic range (e.g., about 1% offset variation) and gauge factor (e.g., about 2 or more). As discussed above, the force sensing data can then be combined with capacitive sensing data to estimate force at one or more touch locations for a more robust, intuitive, and effective input, as discussed above.

Figure 11:
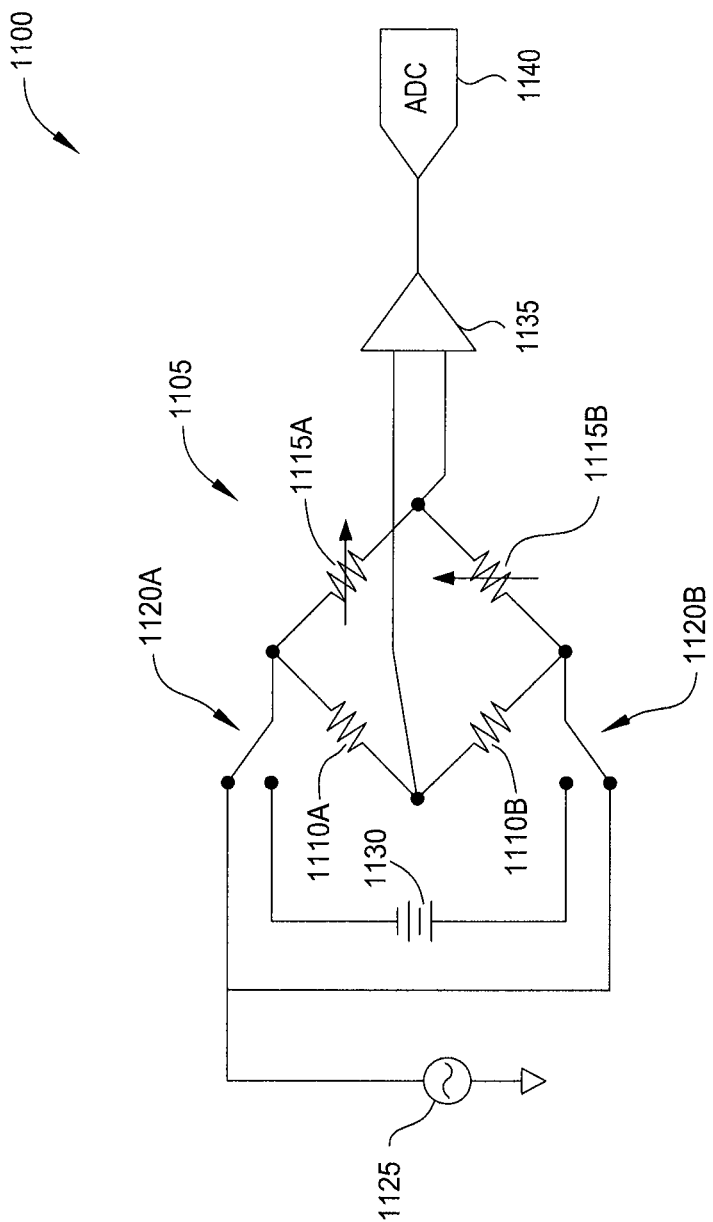
FIG. 11 illustrates an exemplary arrangement for sensing signal using a strain gauge bridge, according to embodiments described herein.

FIG. 11 illustrates an exemplary arrangement for sensing signal using a strain gauge bridge, according to embodiments described herein. More specifically, arrangement 1100 illustrates a sensing half-bridge 1105 comprising resistances 1110A, 1110B and strain gauges 1115A, 1115B. The arrangement 1110 further comprises switches 1120A, 1120B configured to selectively couple the half-bridge 1105 with a selected one of a guarding signal (represented by an AC power source 1125) and with a DC power source 1130. In some embodiments, the half-bridge 1105 is coupled with the DC power source 1130 when performing force sensing, and is coupled with the guarding signal when not performing force sensing. Further, in some embodiments, the half-bridge 1105 is coupled with the guarding signal when touch sensing is performed. The arrangement 1135 further comprises an instrumentation amplifier 1135 and an analog-to-digital converter (ADC) 1140.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device for sensing force applied by input objects, the input device comprising: a display device configured to provide display and touch sensing capabilities, the display device comprising: a top surface; a plurality of layers formed as a single display stack; display electrodes and touch sensing electrodes formed in one or both of: (i) one or more display electrode layers, and (ii) one or more touch sensing electrode layers of the plurality of layers; and one or more strain gauges formed in one or both of (i) and (ii), the one or more strain gauges configured to detect force applied to the top surface, wherein the one or more strain gauges are formed using one or more touch sensing electrodes selected from the touch sensing electrodes, and wherein the selected one or more touch sensing electrodes are configured to perform force sensing and capacitive proximity sensing.

2. The input device of claim 1, wherein the display stack comprises:
   a first substrate on which the display electrodes are disposed; and
   a second substrate on which the touch sensing electrodes are disposed.

3. The input device of claim 2, wherein the first substrate comprises a thin-film transistor (TFT) glass.

4. The input device of claim 1, wherein the display electrodes comprise organic light emitting diode (OLED) display electrodes.

5. The input device of claim 4, wherein the display stack comprises:
   a substrate on which the OLED display electrodes and the touch sensing electrodes are disposed.

6. The input device of claim 4, wherein the display stack comprises:
   a flexible substrate on which the one or more strain gauges are disposed.

7. The input device of claim 1, further comprising:
   at least one supporting member contacting a first layer of the plurality of layers at a top surface or a bottom surface of the first layer, wherein the at least one supporting member is configured to support, using a projection extending toward a middle portion of the display stack, lateral portions of the display stack while permitting deflection of the middle portion of the display stack,
   wherein the one or more strain gauges are arranged in the lateral portions of the display stack between the at least one supporting member and one of a top surface and a bottom surface of the display stack.

8. The input device of claim 1, wherein the one or more strain gauges are arranged to form at least one strain gauge bridge.

9. The input device of claim 1, wherein the one or more strain gauges comprise two strain gauges, the input device further comprising:
   a first routing electrode coupling the two strain gauges with a processing system, wherein the first routing electrode carries a common excitation signal to the two strain gauges.

10. The input device of claim 9, wherein the two strain gauges are arranged to form two strain gauge bridges.

11. The input device of claim 1,
    wherein each of the one or more strain gauges comprises a respective one or more of the touch sensing electrodes.

12. The input device of claim 11, wherein the touch sensing electrodes comprise:
    a plurality of transmitter electrodes; and
    a plurality of receiver electrodes,
    wherein each of the one or more strain gauges comprises one or more transmitter electrodes selected from the plurality of transmitter electrodes.

13. The input device of claim 1, wherein the one or more strain gauges are formed in a first touch sensing electrode layer and are overlapping with a display region of the display device.

14. The input device of claim 1, wherein the one or more strain gauges are formed in a first display electrode layer and are non-overlapping with a display region of the display device.

15. The input device of claim 1,
    wherein the one or more strain gauges are formed in a first display electrode layer, and
    wherein the touch sensing electrodes comprise common electrodes of the display electrodes.

16. The input device of claim 15, wherein the common electrodes are substantially transparent.

17. The input device of claim 1, wherein a first layer of the plurality of layers comprises:
    a strain-concentrating feature at an interface with an adjacent member of the display device,
    wherein at least one of the one or more strain gauges is disposed proximate to the interface.

18. The input device of claim 1, further comprising:
    a processing system configured to:
      perform display updating using the display electrodes;
      perform touch sensing using the touch sensing electrodes; and
      perform force sensing using the one or more strain gauges.

19. The input device of claim 18, wherein the processing system is further configured to:
    transition the input device out of a predefined low power mode upon sensing force applied by an input object.

20. A processing system for an input device, the processing system comprising:
    display driver circuitry configured to update display electrodes of a display device of the input device;
    capacitive sensing circuitry configured to operate touch sensing electrodes of the input device to acquire capacitive proximity sensing data, wherein the display electrodes and the touch sensing electrodes are formed in one or both of (i) one or more display electrode layers, and (ii) one or more touch sensing electrode layers; and
    force sensing circuitry configured to:
      acquire force sensing data using one or more strain gauges formed in one or both of (i) and (ii) and configured to detect force applied to a top surface of the input device; and
      refine the acquired force sensing data based on the acquired capacitive proximity sensing data,
    wherein the one or more strain gauges are formed using one or more touch sensing electrodes selected from the touch sensing electrodes, and
    wherein the selected one or more touch sensing electrodes are configured to perform force sensing and capacitive proximity sensing.

21. The processing system of claim 20, wherein the touch sensing electrodes comprise:
    a plurality of transmitter electrodes; and
    a plurality of receiver electrodes configured to perform capacitive proximity sensing,
    wherein each of the one or more strain gauges comprises one or more transmitter electrodes selected from the plurality of transmitter electrodes.

22. The processing system of claim 20, wherein the force sensing circuitry and the capacitive sensing circuitry include shared circuitry.

\* \* \* \* \*